United States Patent [19]
Sheetz

[11] 3,820,496
[45] June 28, 1974

[54] CONVEYER FEEDER

[75] Inventor: Charles E. Sheetz, Woodstock, Va.

[73] Assignee: FMC Corporation, San Jose, Calif.

[22] Filed: May 12, 1972

[21] Appl. No.: 252,647

[52] U.S. Cl. .................... 214/313, 214/654, 302/15
[51] Int. Cl. ............................................. B65g 65/04
[58] Field of Search .......... 214/302, 303, 312, 313, 214/314, 654, 307; 302/14, 15, 16

[56] References Cited
UNITED STATES PATENTS

| | | | |
|---|---|---|---|
| 1,195,245 | 8/1916 | Lowes et al. ...................... | 214/307 |
| 1,732,391 | 10/1929 | Wentworth ...................... | 214/313 |
| 2,661,830 | 12/1953 | Total .............................. | 198/56 |
| 2,741,379 | 4/1956 | Stryker .......................... | 214/152 |
| 2,804,982 | 9/1957 | Verrinder ....................... | 214/306 |
| 3,167,197 | 1/1965 | Lee ................................ | 214/313 |
| 3,269,571 | 8/1966 | McLearn et al. ................ | 302/14 |

Primary Examiner—Robert J. Spar
Assistant Examiner—Lawrence J. Oresky
Attorney, Agent, or Firm—R. S. Kelly; C. E. Tripp

[57] ABSTRACT

An elevator receives a bin with articles of produce therein at a location above a tank of water and is operated to immerse the bin within the tank to discharge the articles. A dump mechanism on the elevator pivots the immersed bin about an upper side edge thereof to dump the articles from the bin over a partition separating a portion of the tank under the bin from a portion of the tank over an inclined conveyer that transports the articles upwardly out of the tank. Bins of a variety of sizes can be clamped upon the elevator with one side edge thereof at a uniform location relative to the pivotal axis of the dump mechanism, and the partition is collapsible to minimize the drop from any size bin to the lowermost end of the conveyer. Water circulates to provide a current within the tank that conveys floating articles towards the upper end of the conveyer for removal from the tank. A gate, adjustably positioned over the conveyer, limits the loading depth of articles thereon.

7 Claims, 14 Drawing Figures

FIG_3

FIG_4

FIG_10

FIG_11

FIG_12

FIG_13

CONVEYER FEEDER

BACKGROUND OF THE INVENTION

1. Field of the Invention

This invention relates to bin emptying and conveyor feeding. More specifically, the invention concerns an apparatus for transferring relatively fragile articles of produce, such as peaches or tomatoes, from bins onto a conveyor.

2. Description of the Prior Art

Produce is brought to a processing plant in bins or boxes, which must be emptied and the produce transferred therefrom onto a conveyor. Bin emptying can be achieved by tilting the bins to discharge articles of produce therefrom by gravity but care must be taken to avoid damage to the produce resulting from collisions between falling articles or with other articles upon termination of their fall. Water has been used to prevent damage by cushioning the articles during the dumping operation.

One known feeder provides for tilting bins above a tank filled with water so fruit falls into the water and settles upon a sloping grill near the bottom of the tank. A conveyor having one end positioned adjacent the lowermost end of the sloping grill receives the fruit sliding downward therefrom and extends upwardly out of the tank to a position where the fruit is conveyed for discharge. Some damage to the fruit has been experienced with this feeder resulting from collisions between the individual fruit before entering the water.

Another feeder provides for immersion of the fruit carrying bins in a tank of water before dumping the fruit therefrom onto an inclined grill for feeding to a conveyor. One problem encountered with this feeder is that dumped articles tend to remain upon the inclined grill and are crushed when the next bin is immersed. Even when a second conveyor was substituted for the inclined grill, fruit removal was too slow for a desired rate of dumping bins. Another problem with this feeder is that the elevator for immersing bins could handle but one bin size.

A problem with both feeders described hereinbefore is that when a bin is dumped, fruit falling therefrom spreads out over a side area, and this makes collection and removal of the fruit more difficult. Since the bins are rotated about a central axis, the bin edge over which the fruit falls moves outwardly with rotation of the bin from its initial vertical position, and this tends to enlarge the area over which the fruit is dumped. Furthermore, neither of the known feeders provide for handling of that portion of the fruit which may float.

SUMMARY OF THE INVENTION

This invention provides for rapidly emptying bins of relatively fragile produce and transferring articles therefrom onto an endless conveyor with a minimum amount of damage to the produce. While it is primarily intended for handling a non-floating type of produce, such as potatoes, tomatoes and peaches, it is also capable of handling floating articles.

The problem of dumped produce articles being crushed under the elevator carriage upon immersion of a bin and subsequent to the dumping of the articles is solved by a partition that blocks articles from moving under the elevator carriage. The partition guides articles towards the lowermost end of an inclined feeder conveyor which, together with the partition, forms a hopper upon which articles collect before removal. Bins are pivoted about an upper side edge thereof so as to limit the area over which the articles are dumped and thereby facilitate rapid removal of the articles upon the conveyor.

The problem of handling various sized bins is solved by clamping the bins in a manner so that an upper side edge is always at a given location adjacent the pivotal axis for dumping and by making the partition collapsible beneath a bin to enable the lowering of the bin to a level that minimizes the drop therefrom to the lowermost end of the conveyor.

The problem of handling floating articles is solved by circulating water to provide a current within the tank to convey the floating articles towards the conveyor for discharge from the tank. Non-floating articles settle upon the conveyor and are thereby removed, while a gate adjustably positioned over the conveyor limits the loading depth of articles conveyed upwardly thereon.

The apparatus for emptying the produce bins and transferring the articles of produce therefrom onto a conveyor generally includes a tank for holding a quantity of liquid therein, a conveyor in a dumping zone of the tank and inclined upwardly from a lower portion of the tank to a top portion thereof, an elevator for immersing bins within liquid in an immersion zone of the tank, a dump mechanism mounted upon the elevator for pivoting the immersed bin to a position where articles are discharged therefrom by gravitational force, and a partition positioned within the tank between the location where bins are immersed and a location at the lowermost and of the conveyor with said partition extending upward to a level over which articles can be dumped from the bin with a minimum drop to the lowermost end of the conveyor but blocking articles from moving under the elevator so as to be crushed by a subsequent bin immersion.

DESCRIPTION OF THE PREFERRED EMBODIMENT

Figure 1:
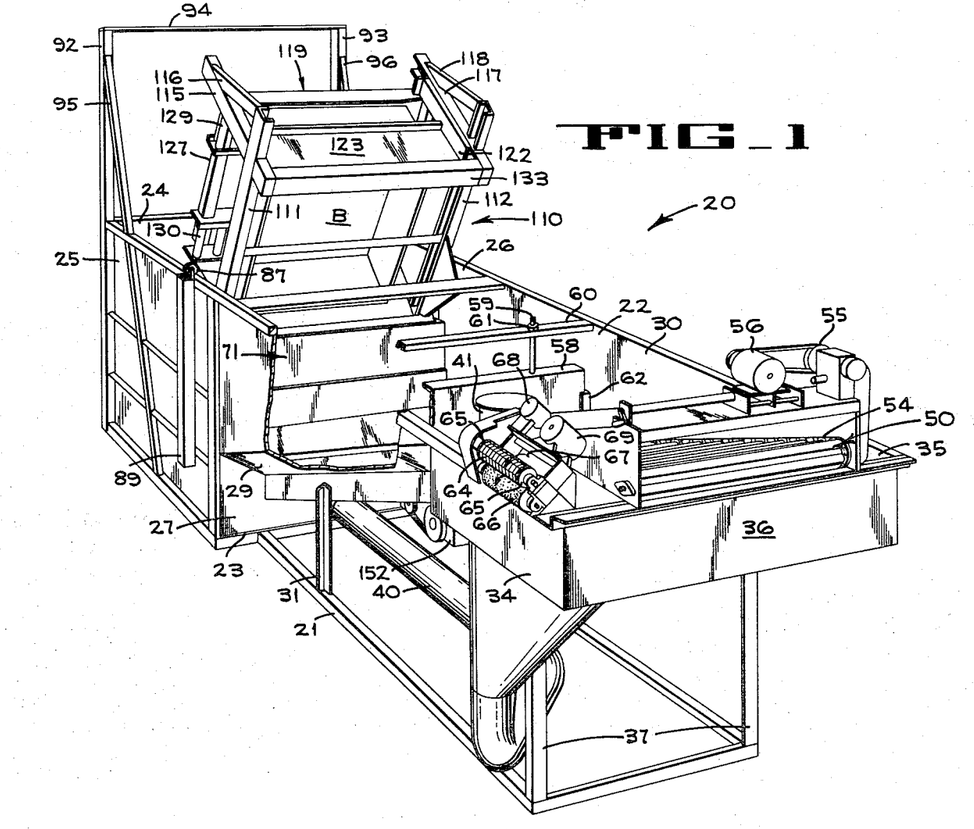
FIG. 1 is a perspective view of a conveyor feeder embodying the present invention with portions of the feeder broken away to show underlying structure.
Figures 2, 2A:
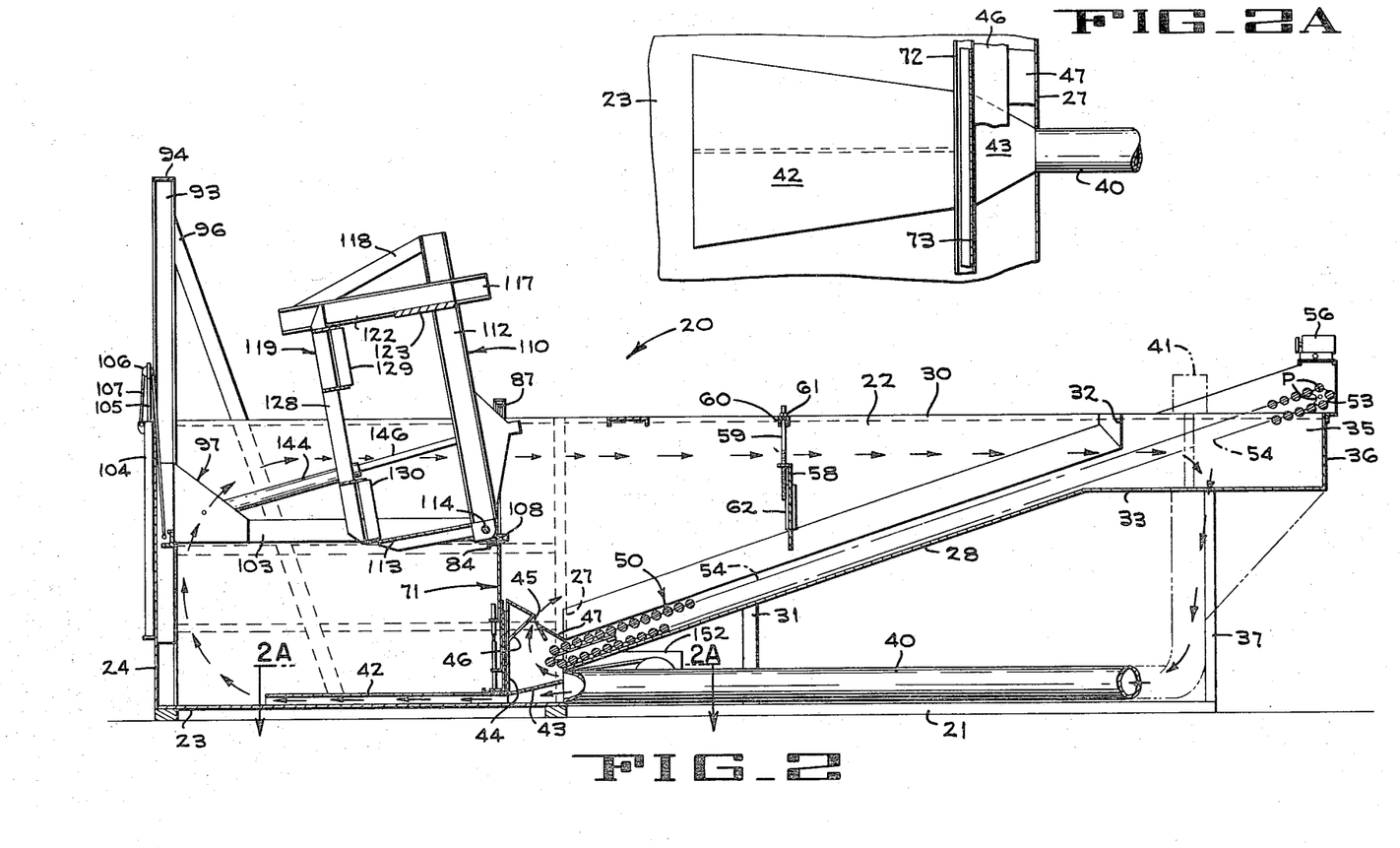
FIG. 2 is a longitudinal section of the feeder shown in FIG. 1.
FIG. 2A is an enlarged section taken on line 2A—2A of FIG. 2, illustrating the top of a conduit within the feeder.

Looking first at FIGS. 1 and 2, a conveyor feeder 20 has a skid unit 21 upon which a tank 22 is mounted. As bin-immersing well portion of the tank is defined by a bottom 23, an end panel 24, side panels 25 and 26, and a low front wall 27. A conveyor trough portion of the tank is defined by a bottom 28 and a pair of side walls 29 and 30 that rise vertically from the bottom, slope laterally upward and outward to widen the trough above the bottom and then rise vertically to the top of the tank. This portion of the tank is attached to the low front wall 27 and is supported so as to extend outwardly therefrom by a pair of stilts 31 that project upward from skid unit 21. The conveyor trough portion of the tank is coupled at its outer end to a discharge basin portion defined by a pair of rear panels 32 which widen the tank from the conveyor portion, a bottom 33 integral with the bottom 28 (FIG. 2), a pair of side panels 34 and 35, and a front panel 36, all of which are supported by a pair of stilts 37 projecting upward from the skid unit.

A pipe 40 is connected between bottom 33 of the discharge basin and front wall 27 of the bin immersing well, and a pump 41 provides a flow of water from the discharge basin through the pipe into the bin immersing well. Positioned to receive a substantial portion of the flow from pipe 40 within the bin immersing well is a conduit 42 (FIGS. 2 and 4) which has a receiving end 43 in abutment with the pipe and which diverges outwardly therefrom, as shown in FIG. 2A, to discharge a wide stream that extends substantially across the width of end panel 24. The stream is deflected upwardly by the end panel towards the top of tank 22 where gravitational forces urge the water towards the discharge basin.

A plate 44 (FIG. 4) projects upright from bottom 23 about conduit 42 and extends transversely between side panels 25 and 26 to deflect that portion of flow from pipe 40 passing above receiving end 43 upwardly and forwardly through a slot 45 located between an angle 46 mounted at the top of the plate and an angle 47 adjacent thereto, with both angles extending between the side panels. This flow tends to dislodge fruit resting upon the angles so as to guide the fruit toward the lowermost end of a conveyor 50.

Conveyor 50 extends from below angle 47 to a location above front panel 36 of the discharge basin and fits within the narrow lower portion of the conveyor trough. A plate 51 (FIG. 4), having a curved end portion 52 extends between side walls 29 and 30 at the lower end of the conveyor while a fluted roller 53 (FIG. 2) having pockets P that extend longitudinally thereof at spaced intervals about its outer periphery is mounted for rotation above front panel 36 at the upper end of the conveyer. An endless roller chain 54 is trained about the curved end portion 52 of the plate 51 and about fluted roller 53. Rollers on the chain extend transversely between the side panels on opposite sides of the conveyor and fit within the pockets P in fluted roller 53 at the upper end of the conveyor with the fluted roller thereby acting as a sprocket for driving the roller chain. The fluted roller 53 is driven continuously during operation of the apparatus through a suitable drive connection 55 connecting the roller with a drive motor 56 (FIG. 1).

A gate 58 (FIGS. 1 and 2) is suspended above conveyor 50 by bolts 59 that fit through openings in a transverse channel 60 and are held in place by adjusting nuts 61 threadably fitted upon the bolts to engage the upper surface of the channel. Thus, the gate can be positioned with its bottom edge at a desired elevation above conveyor 50 to limit the level of produce carried upward thereon. Gate 58 is held in place against the current flow within the conveyor trough by braces 62 which project inward from side walls 29 and 30 to engage the side edges of the gate.

An endless screen conveyor 64 (FIG. 1) is trained about a pair of sprockets 65 mounted above and at one side of the discharge basin portion of tank 22. A second pair of sprockets (not shown) is located within the tank to mount the lower end of the screen conveyor. The drive roller is driven through a suitable drive from a motor 69 through a gear reducer 68. The screen conveyor extends across the inlet to pipe 40 for preventing leaves and trash from entering the pipe and for removing such articles from the tank. A brush 66 is located below the drive sprockets 65 and is rotated in the same direction as the sprockets 65 for engaging the lower reach of the screen conveyor to clean the leaves or other debris therefrom.

Figure 3:
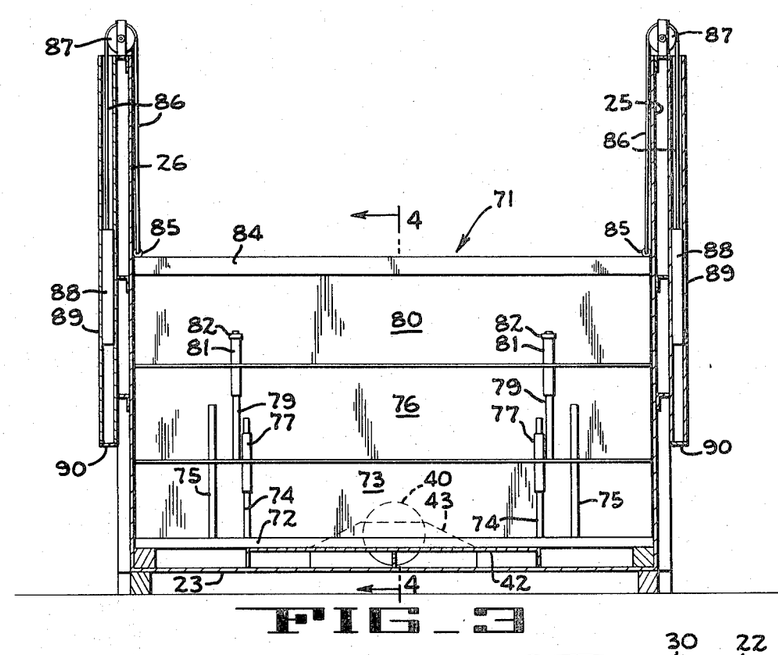
FIG. 3 is an enlarged transverse section of the feeder tank illustrating a collapsible partition therein.
Figure 4:
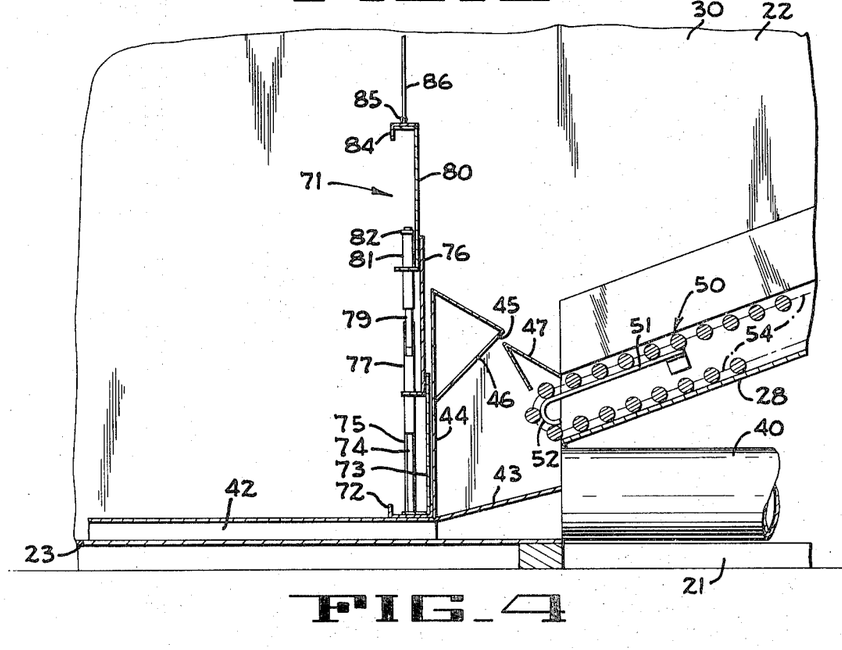
FIG. 4 is an enlarged section taken on the line 4—4 of FIG. 3.

A collapsible partition 71, shown in FIGS. 2, 3 and 4, is located adjacent plate 44 in tank 22 to separate the bin-receiving well portion of the tank from that portion of the tank above the conveyor 50. A channel 72, shown in FIG. 4, rests upon conduit 42 and extends transversely between side panels 25 and 26. Fixed to the channel is an angle 73 that stands upright therein with its longest leg projecting parallel with plate 44 and forming the lower wall of the partition. A pair of inner vertical guide rods 74 and a pair of outer vertical guide rods 75 are attached to the short base leg of angle 73 so as to project in a vertical direction parallel with the upright leg of the angle. A second angle 76 forms the middle wall of the partition and is arranged to nest within angle 73. The base leg of angle 73 is provided with holes, not shown, for slidably receiving the projecting ends of the guide rods 75. Sleeves 77 are secured to the base leg of the angle 76 to receive the projecting ends of the guide rods 74. A pair of upright guide rods 79 are fixed to and project upwardly from the short base leg of the second angle 76. A channel 80, which forms the upper wall of the partition, has a pair of sleeves 81 fixed in the lower flange thereof for slidably receiving the guide rods 79. The channel 80 is arranged to nest within angle 76 and holes (not shown) are also provided in the lower channel flanges for receiving the upper projecting ends of the guide rods 74 and 75. Each guide rod 79 has a nut 82 threadably fitted thereon at the top thereof to prevent removal of the channel 80 (or the angle 73 and 76) from about the guide rods.

An angle 84 is fixed to the upper flange of channel 80, and projecting upward at each end of the angle is an eyelet 85, as shown in FIG. 3. Each eyelet has a counterbalancing weight connected thereto to urge partition 71 upward to a fully extended position in a manner similar to the balancing of a window sash where the vertical faces of each of the members 73, 76 and 80 are vertically separated (FIGS. 3 and 4). A cord 86 having one end connected to eyelet 85 adjacent side panel 26 extends over a pulley wheel 87 mounted on top of side panel 26, and attached to the other end of the cord is a counterweight 88 that fits within a narrow tubular housing 89 mounted to the outside of the side panel. A stop 90 is provided at the bottom of the counterweight housing to limit downward movement of the counterweight and thereby prevent the upward expansion of the partition 71 to where sleeves 77 separate from guide rods 74. Mounted upon side panel 25 is a counterbalancing means similar to that mounted on side panel 26 with like parts being given the same reference numerals.

As shown in FIG. 1, an elevator tower is formed as an integral part of tank 22 by a pair of upright channels 92 and 93 having flanges facing inward of the tank adjacent end panel 24, a top cross member 94 that braces the channels transversely of the tank, and inclined braces 95 and 96 that support channels 92 and 93, respectively, longitudinally of the tank. An elevator carriage 97, shown in FIGS. 2, 5 and 6, has a pair of vertical runners 98 and 99 (FIG. 6) that are held in spaced apart relationship by transverse bracing. Each runner is provided with a pair of rollers 100 projecting outwardly therefrom to provide rolling engagement for the carriage between the webs of channels 92 and 93. A pair of rollers 101 project outwardly from each runner between the two flanges of a respective channel to provide further rolling engagement between the runner and its associated mounting channel. A cantilever arm 102 projects forwardly within tank 22 from runner 98, and a cantilever arm 103 correspondingly projects from runner 99. An abutment member 108 extends transversely between the distal ends of each of the cantilever arms 102 and 103 for contacting angle 84 at the top of collapsible partition 71.

Vertical movement of elevator carriage 97 within the elevator tower is controlled by a pair of hydraulic cylinders 104 mounted on the outside of end panel 24 with one cylinder being located adjacent channel 92 and the other cylinder being located adjacent channel 93. Each cylinder has an actuating arm 105 with a pulley wheel 106 rotatably mounted at the outermost end of the arm. A cord 107 (FIG. 5) is trained about the pulley wheel with one end of the cord connected to the elevator carriage and the other end of the cord connected to the hydraulic cylinder. Thus, when the actuating arm is vertically extended, the elevator carriage is raised, and, when the actuating arm is retracted, the elevator carriage is lowered.

A frame 110, shown in FIGS. 1 and 2, is pivotally mounted between cantilever arms 102 and 103 of elevator carriage 97. This frame includes a pair of longitudinal members 111 and 112 with transverse supports therebetween which members form a first frame portion for contacting the top of a bin B. A second frame member 113 extends transversely between the longitudinal members at one end thereof and projects perpendicularly thereto to provide a surface for contacting the forward facing side of the bin. The frame is pivotally mounted to the cantilever arms along an axis 114a of a shaft 114 which extends across the forward end of the frame between members 111 and 112 and is rotatably journalled within the projecting ends of the cantilever arms 102 and 103.

A channel 115 is mounted perpendicular to longitudinal frame member 111 near the end thereof opposite from pivot shaft 114, and a brace 116 (FIG. 5) extends diagonally between that end of the longitudinal frame member and the lower end of the channel. In like manner, a channel 117 is mounted to longitudinal frame member 112 and supported by a brace 118. The channel flanges face inward of frame 110 to guide a movable platform 119.

Movable platform 119 includes a pair of vertical runners 121 and 122 that are held in spaced relationship by a panel 123. A pair of rollers 124 project outwardly from each runner to provide rolling engagement with the webs of channels 115 and 117, and a second pair of rollers 125 project outwardly from each runner between the two flanges of the associated mounting channel to provide rolling engagement therewith.

A cantilever arm 127 (FIG. 1) projects perpendicularly from vertical runner 121 and extends in a horizontal plane parallel to but below the longitudinal frame member 111. Similarly, a cantilever arm 128 projects from runner 122 and extends parallel to and below longitudinal frame member 112. A pair of fixed roller conveyors 129 and 130 extend between cantilever arms 127 and 128 with the rollers thereon defining a surface to facilitate moving a bin B from one side of tank 22 to a position centered on the platform between tank side panels 25 and 26.

Movable platform 119 is raised and lowered within frame 110 by a hydraulic cylinder 132 (FIG. 6) mounted to a transverse frame member 133 that extends between channels 115 and 117 at the upper ends thereof. The hydraulic cylinder has an actuating arm 134 with a clevis 135 mounted thereon to which a pair of cords 136 and 137 are connected. Cord 136 is trained about a pulley wheel 138 and connected to the vertical runner 122 while cord 137 is trained about pulleys 139, 140 and 141 before connection to the opposite vertical runner 121. Thus, when actuating arm 134 is extended, movable platform 119 is lowered, and, when the actuating arm is retracted, the platform will be elevated relative to the bin mounting frame 110.

Figure 5:
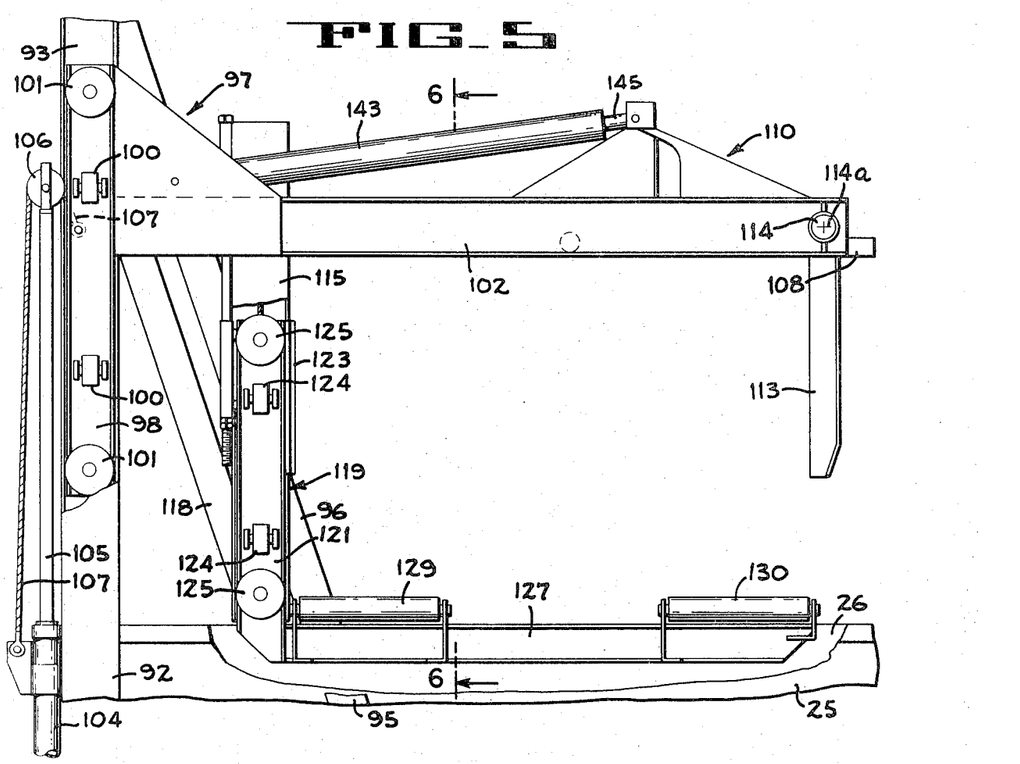
FIG. 5 is an enlarged fragmentary side view of the bin elevator with portions broken away to show underlying structure.
Figure 6:
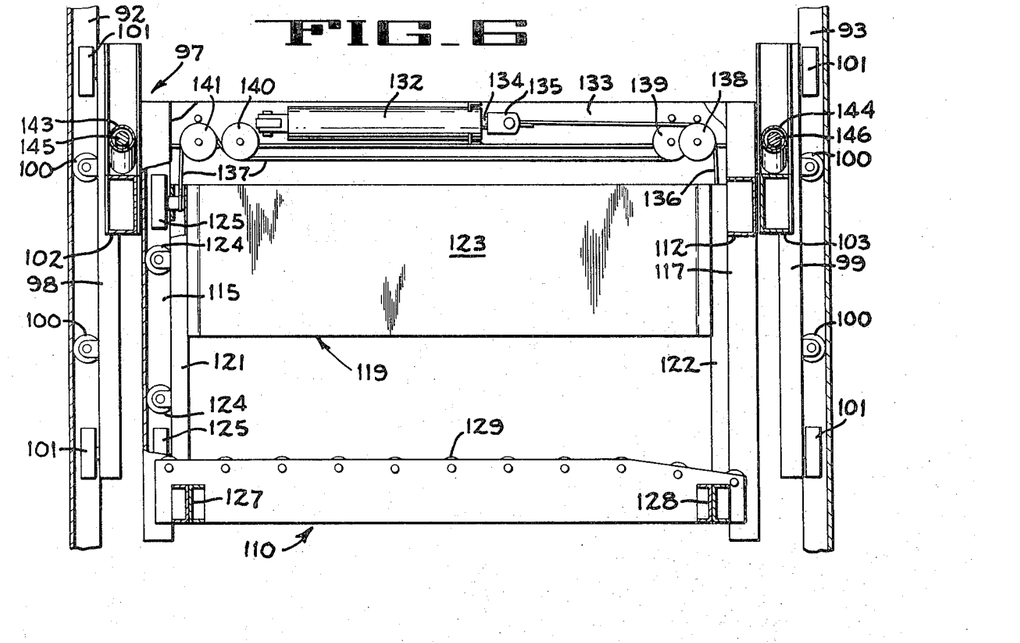
FIG. 6 is a broken section taken on the line 6—6 of FIG. 5 with the elevator bin platform being raised slightly within its frame.

Frame 110 is pivoted about the axis of the shaft 114 within elevator carriage 97 by a hydraulic cylinder 143 (FIG. 5) connected to cantilever arm 102 and a similar hydraulic cylinder 144 (FIG. 2) connected to cantilever arm 103. An actuating arm 145 extends from cylinder 143 to connect with an upright plate attached to longitudinal member 111, while an actuating arm 146 extends from cylinder 144 to connect with an upright plate attached to longitudinal member 112. Thus, when the actuating arms are retracted, as shown in FIG. 5, frame 110 is positioned with the forward wall member 113 depending vertically, but when the actuating arms are retracted, frame 110 pivots, as shown in FIGS. 1 and 2, with the forward wall member 113 being rotated upwardly.

Figure 7:
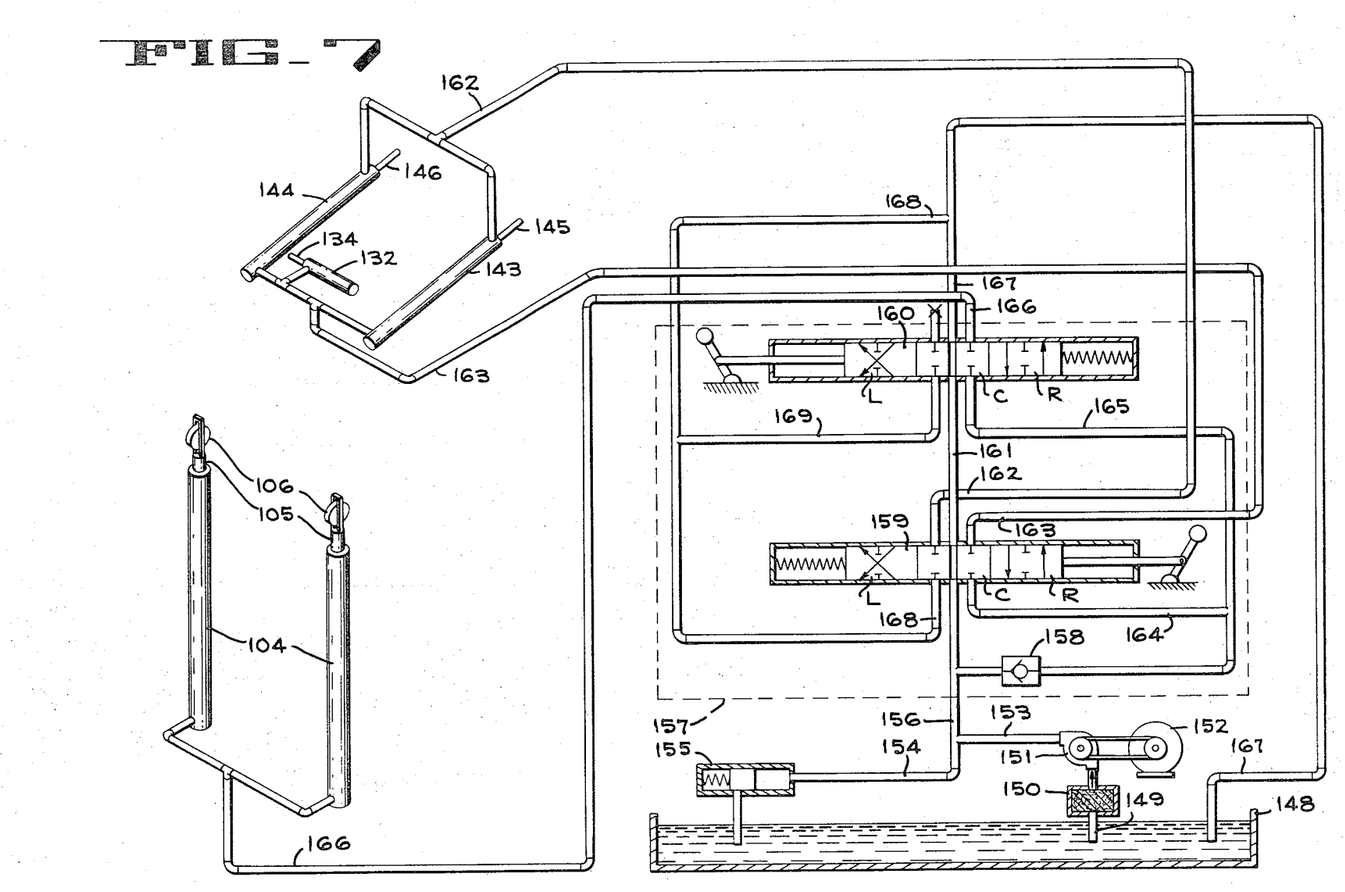
FIG. 7 is a schematic diagram of the hydraulic system for operating the bin elevator and dump mechanism.

Looking now at FIG. 7, the hydraulic circuitry for the present invention will be seen to include a hydraulic fluid reservoir 148 with a suction line 149 submerged therein to provide fluid which flows through a filter 150 to a fixed displacement pump 151 which is driven by a motor 152. From the pump, a discharge line 153 is connected to a return line 154 having a maximum pressure valve 155 therein to enable fluid to return to the reservoir upon the build-up of an excessive pressure in the hydraulic circuitry. Discharge line 153 is also connected to a line 156 that leads to a two spool directional control valve 157 with an integral check valve 158 therein.

Within valve 157 is a first spool 159 and a second spool 160, both of which are manually controlled between three positions with six connections. Spool 159 controls fluid flow through a line 161 to spool 160, through a line 162 to the hydraulic cylinders 143 and 144 for retracting pivot frame 110, and through a line 163 to hydraulic cylinders 132 for clamping a bin within frame 110 and to cylinders 143 and 144 for pivoting frame 110. When check valve 158 opens, fluid is allowed to flow to spool 159 through a line 164 and to spool 160 through a line 165. Spool 160 controls fluid flow through a line 166 to the pair of hydraulic cylinders 104 for raising and lowering the elevator and through a line 167 to reservoir 148. A reservoir return line 168 provides communication from spool 159 to line 167, and a line 169 provides similar communication for spool 160.

Figure 8:
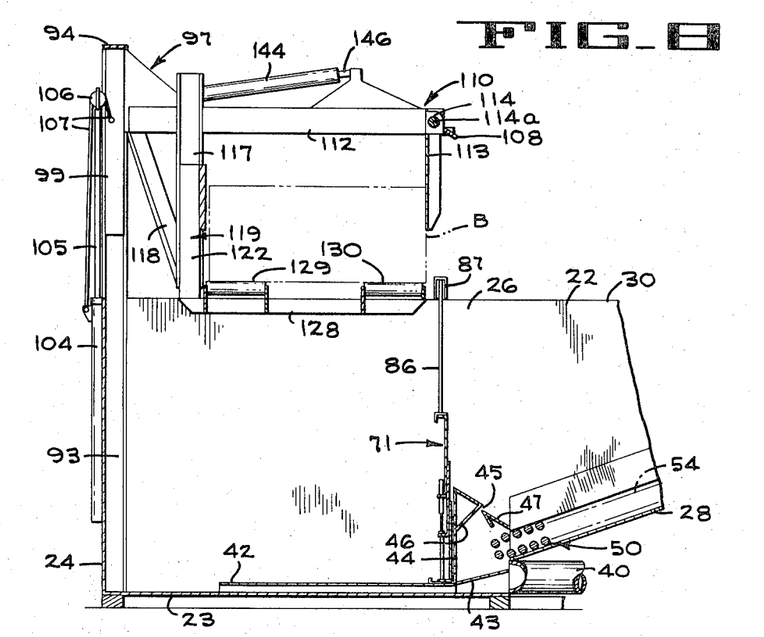
FIGS. 8–13 are operational views illustrating the sequential steps in dumping a bin within the feeder.
Figure 9:
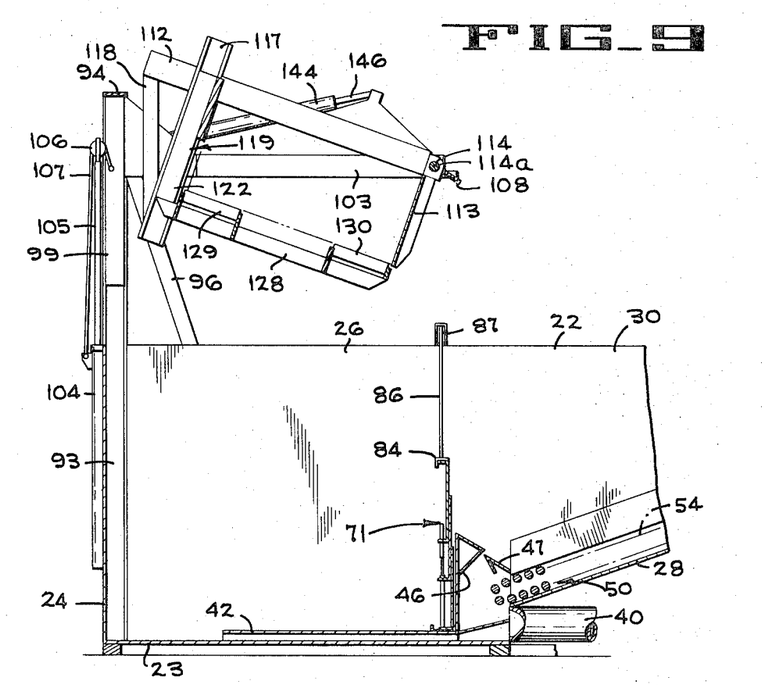

In operation, elevator carriage 97 is in an elevated position as shown in FIG. 8 with roller conveyors 129 and 130 aligned slightly above the top of tank 22 to receive a bin B, as indicated in phantom line. Spool 159 is then moved just briefly so that connection is made with spool position R causing frame 110 to pivot slightly so bin B slides against the forward wall member 113 and causing movable platform 119 to elevate, clamping the top of the bin against the frame members 111 and 112, as shown in FIG. 9.

Figure 10:
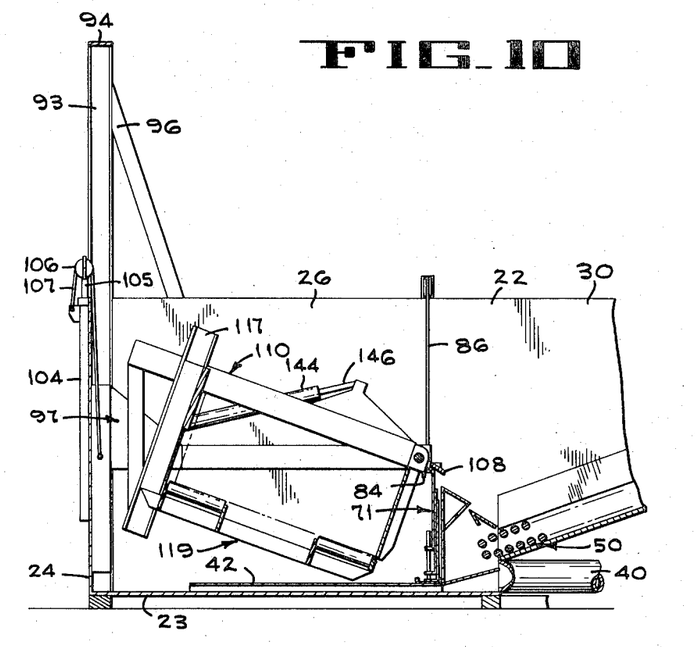
Figure 11:
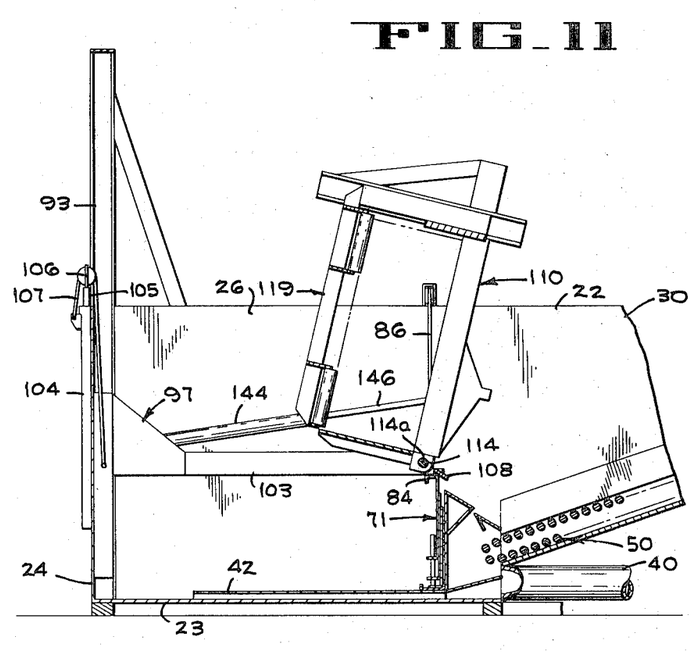

Spool 159 is then quickly returned to a centered spool position C, and spool 160 is moved so that connection is made with spool position L allowing fluid to return through lines 166, 169 and 167 to reservoir 148. This causes elevator carriage 97 to be lowered under its own weight, compressing collapsible partition 71 to the position shown in FIG. 10 and immersing bin B within tank 22. Spool 159 is then moved again so that connection is made with spool position R actuating hydraulic cylinders 143 and 144 to pivot frame 110 to the position shown in FIG. 11 for dumping articles from bin B over partition 71.

Figure 12:
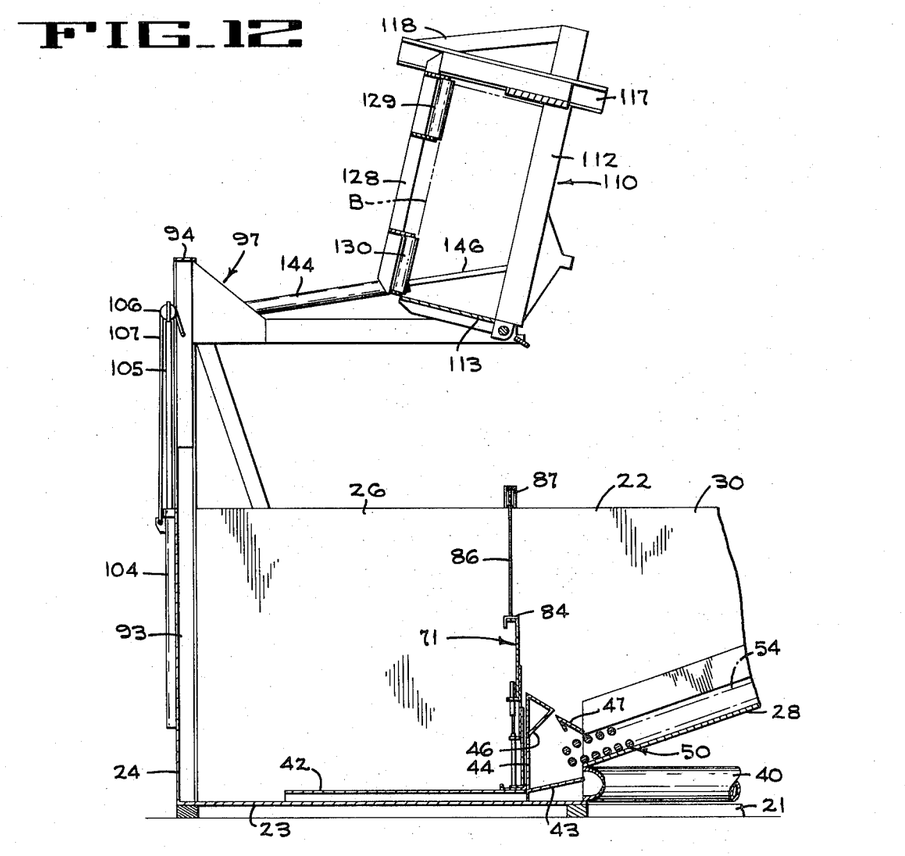
Figure 13:
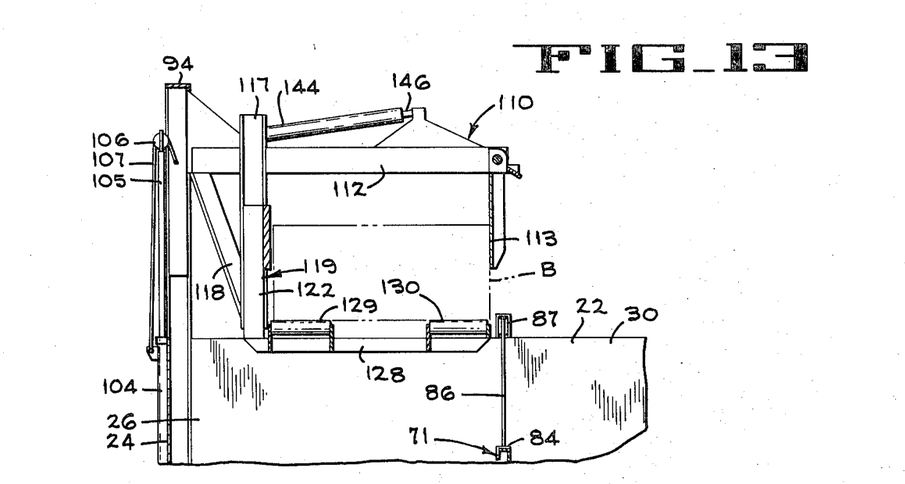

Articles flow from bin B over partition 71, angle 46 and angle 47 onto the lowermost end of conveyor 50 which conveys them upward out of the tank. When the bin is empty, spool 160 is moved so that connection is made with spool position R actuating hydraulic cylinders 104 to raise elevator carriage 97 to the position shown in FIG. 12. Partition 71 expands upward in response to counterweights 88 so as to prevent articles from moving backward beneath the elevator carriage as the frame structure 110 is elevated. Spool 159 is then moved so that connection is made with spool position L, permitting hydraulic cylinders 143, 144 and 132 to be exhausted and allowing frame 110 and movable platform 119 to return to the position shown in FIG. 13. The empty bin is then removed before a loaded bin is inserted and the process repreated.

Although the best mode contemplated for carrying out the present invention has been herein shown and described, it will be apparent that modification and variation may be made without departing from what is regarded to be the subject matter of the invention.

What is claimed is:

1. An apparatus for emptying bins and transferring articles of produce therefrom onto a conveyor, said apparatus comprising a tank for holding a quantity of liquid therein; a conveyor inclined upwardly from a lower portion of the tank to a top portion thereof; an elevator for immersing bins within liquid in the tank; a dump mechanism mounted upon the elevator for pivoting an immersed bin to a position where articles are discharged by gravitational force from the bin at a position beneath the surface of the liquid in the tank; a partition positioned within the tank between the location where bins are immersed and the location at the lowermost end of the conveyor, said partition extending upward to a level over which articles can be dumped from the bin while preventing articles so dumped from moving into the location where bins are immersed; and means mounting said partition for vertical movement wherein said partition can be lowered with the elevator to minimize the drop from any size bin to the lowermost end of the conveyor and then raised upon elevating the elevator to prevent dumped articles from moving under the elevator.

2. An apparatus for emptying bins and transferring articles of produce therefrom onto a conveyor, said apparatus comprising a tank for holding a quantity of liquid therein; a conveyor disposed within a dumping zone of said tank and inclined upwardly from a lower portion of the tank dumping zone to a top portion thereof; an elevator carriage for immersing bins within liquid in the tank at an immersion zone spaced horizontally from the lowermost receiving end of the conveyor; means mounting said elevator carriage for vertical movement between an upper level above the tank and a lower level within the tank; a frame pivotally mounted upon said elevator carriage; means for clamping a bin against the frame with a top side edge of the bin extending parallel with and adjacent to the pivotal axis of the frame to the carriage; a dump mechanism mounted upon the elevator for pivoting the frame with the bin clamped thereto to a position where articles are discharged by gravitational force from the bin toward the lowermost end of the conveyor; means for actuating said dump mechanism when said elevator carriage is at said lower level wherein said bin is immersed in the liquid in said tank; and a partition positioned within the tank adjacent the lower receiving end of the conveyor and separating the bin immersion zone from the dumping zone and the lowermost end of said conveyor therein, said partition extending upward to a point adjacent the level of the top side of an immersed bin on the elevator carriage and located so that when the bin is pivoted by the dump mechanism, articles can be dumped from the bin over the partition into the location at the lowermost end of the conveyor, said partition preventing articles so dumped from moving backward into the location where the bins are immersed.

3. The apparatus described in claim 2, wherein said carriage has a lip that extends over said partition and contacts the partition when the carriage is lowered, said partition being formed with relatively movable portions whereby said partition is collapsible beneath said carriage to enable the lowering thereof to a level minimizing the article drop from any size bin to the lowermost end of the conveyor and whereby said partition is expandable upon raising the carriage to an upper level for preventing dumped articles from moving under the carriage.

4. The apparatus described in claim 2 wherein said means for clamping the bin against the frame comprises a platform suspended from said frame and movable relative thereto for receiving a bin.

5. The apparatus described in claim 4 wherein said frame has a first portion for contacting the top of a bin and a second portion located perpendicular to the first portion for contacting one side of the bin; said first and second frame portions intersecting along the same axis as that about which said frame is pivotally mounted upon the carriage; said platform having a first portion for contacting the bottom of the bin and a second portion perpendicular to the first portion of the platform by which the platform is suspended from the frame; said platform first portion having a surface defined by rollers to facilitate moving the bin from one side of the tank transversely of the rollers to a position centered on the platform between the sides of the tank whereby, when said frame is pivoted slightly, the bin slides longitudinally upon the rollers to a position in contact with the frame second portion before being clamped between the first portions of the frame and platform.

6. The apparatus described in claim 2 including means for circulating liquid to provide a current within the tank flowing along the surface of liquid within the tank over the partition and towards the upper end of the conveyor to convey floating articles towards the conveyor for removal thereon.

7. The apparatus described in claim 2, including a gate adjustably positioned over the conveyor to limit the depth of articles conveyed upwardly on the conveyor.

* * * * *